(12) United States Patent
Takahashi (10) Patent No.: US 9,013,743 B2
(45) Date of Patent: Apr. 21, 2015

(54) DATA PROCESSING APPARATUS, DATA PROCESSING SYSTEM, AND COMPUTER-READABLE STORAGE MEDIUM

(71) Applicant: Teruaki Takahashi, Kanagawa (JP)

(72) Inventor: Teruaki Takahashi, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/943,982

(22) Filed: Jul. 17, 2013

(65) Prior Publication Data
US 2014/0029033 A1   Jan. 30, 2014

(30) Foreign Application Priority Data

Jul. 25, 2012 (JP) ................................ 2012-164576
Jun. 10, 2013 (JP) ................................ 2013-122240

(51) Int. Cl.
G06F 3/12 (2006.01)

(52) U.S. Cl.
CPC ............ *G06F 3/1297* (2013.01); *G06F 3/1205* (2013.01); *G06F 3/1253* (2013.01); *G06F 3/1257* (2013.01); *G06F 3/126* (2013.01)

(58) Field of Classification Search
USPC .............. 358/1.13, 1.15, 1.16, 1.18, 448, 1.9, 358/1.14
See application file for complete search history.

(56) References Cited

U.S. PATENT DOCUMENTS

| | | | |
|---|---|---|---|
| 2007/0216944 A1* | 9/2007 | Furuya | 358/1.15 |
| 2010/0134818 A1 | 6/2010 | Minamizono et al. | |
| 2010/0309500 A1 | 12/2010 | Suzuki | |
| 2010/0315672 A1 | 12/2010 | Suzuki | |
| 2010/0328720 A1* | 12/2010 | Suzuki | 358/1.15 |
| 2011/0051185 A1 | 3/2011 | Takahashi | |
| 2011/0058208 A1 | 3/2011 | Takahashi | |
| 2012/0026551 A1* | 2/2012 | Tarumi | 358/1.15 |
| 2013/0027744 A1 | 1/2013 | Takahashi | |

FOREIGN PATENT DOCUMENTS

| | | |
|---|---|---|
| JP | 2004-058306 | 2/2004 |
| JP | 2010-157208 | 7/2010 |
| JP | 2010-218340 | 9/2010 |
| JP | 2010-286873 | 12/2010 |
| JP | 2011-002881 | 1/2011 |
| JP | 2011-008582 | 1/2011 |

* cited by examiner

*Primary Examiner* — Vu B Hang
(74) *Attorney, Agent, or Firm* — Oblon, McClelland, Maier & Neustadt, L.L.P.

(57) ABSTRACT

A data processing apparatus includes an assignment database. The assignment database includes a user-information registration unit configured to collect pieces of user information about users authorized to operate a plurality of information processing apparatuses, and register each piece of user information and an identifier assigned to the corresponding user in association with each other; an output destination association table in which each piece of user information is associated with a printing apparatus that is to be an output destination; and an output-destination determining unit configured to determine the output destination of the output data by referring to the user-information registration unit and the output destination association table.

6 Claims, 7 Drawing Sheets

| UID | USER INFORMATION |
|---|---|
| 00212 | Tanaka |
| 00213 | Saitoh |
| 00214 | Sakurai |
| ⋮ | ⋮ |
| 00305 | Endoh |
| ⋮ | ⋮ |

| USER INFORMATION | PRINTER INFORMATION | | |
|---|---|---|---|
| | PRINTER NAME | PRINTER DRIVER NAME | OUTPUT PORT NAME |
| Katoh | Printer_D | Printer_Driver_d | XXXXXX |
| Saitoh | Printer_A | Printer_Driver_a | XXXXXX |
| Sasaki | Printer_R | Printer_Driver_r | XXXXXX |
| Sakurai | Printer_F | Printer_Driver_f | XXXXXX |
| ⋮ | ⋮ | ⋮ | ⋮ |

| TEXTUAL INFORMATION | PRINTER INFORMATION | | |
|---|---|---|---|
| | PRINTER NAME | PRINTER DRIVER NAME | OUTPUT PORT NAME |
| ddd | Printer_D | Printer_Driver_d | XXXXXX |
| aaa | Printer_A | Printer_Driver_a | XXXXXX |
| rrr | Printer_R | Printer_Driver_r | XXXXXX |
| fff | Printer_F | Printer_Driver_f | XXXXXX |
| ⋮ | ⋮ | ⋮ | ⋮ |

FIG.9

DATA PROCESSING APPARATUS, DATA PROCESSING SYSTEM, AND COMPUTER-READABLE STORAGE MEDIUM

CROSS-REFERENCE TO RELATED APPLICATIONS

The present application claims priority to and incorporates by reference the entire contents of Japanese Patent Application No. 2012-164576 filed in Japan on Jul. 25, 2012 and Japanese Patent Application No. 2013-122240 filed in Japan on Jun. 10, 2013.

BACKGROUND OF THE INVENTION

1. Field of the Invention

The present invention relates to a data processing apparatus, a data processing system, and a computer-readable storage medium.

2. Description of the Related Art

Some conventionally known automatic print-destination assignment systems automatically determine an output destination printer according to a predetermined rule and perform printing. To cause the system to operate as such, what is required of a user is only to select one virtual printer driver via an application and perform printing rather than selecting an output destination. Examples of such a system is disclosed in Japanese Laid-Open Patent Application No. 2010-157208, No. 2011-002881, and No. 2011-008582.

To introduce an automatic print-destination assignment system to a multi-vendor environment where printers having different print functions are coresident, it is necessary to avoid an undesirable situation that print settings accepted from a user cannot be enforced onto a determined output destination printer. In this regard, conventional automatic print-destination assignment systems have adapted to a multi-vendor environment by providing a print setting user interface (UI) that accepts only print settings relating to basic function common among all vendors (function corresponding to public member of a DEVMODE structure). However, this scheme requires to forgo utilizing function specific and inherent to each vendor (function corresponding to private member of the DEVMODE structure), and therefore considerably impairs usability.

Therefore, there is a need to provide a data processing apparatus, a data processing system, and a computer-readable storage medium that allow, in assignment of a print destination in a multi-vendor environment, setting not only print settings relating to basic function common among all vendors but also print settings relating to function specific and inherent to each vender.

SUMMARY OF THE INVENTION

It is an object of the present invention to at least partially solve the problems in the conventional technology.

According to an embodiment, there is provided a data processing apparatus connected over a network to a plurality of information processing apparatuses and a plurality of printing apparatuses to create output data in response to a print request from any one of the information processing apparatuses and then to transmit the output data to an automatically-determined output destination. The data processing apparatus includes an assignment database configured to determine the output destination of the output data; and a first print processing unit including a displaying unit, the first print processing unit being configured to set print settings based on an input entered via a print setting screen, and determine the output destination in accordance with determination made by the assignment database. The assignment database includes a user-information registration unit configured to collect pieces of user information about users authorized to operate the information processing apparatuses, and register each piece of user information and an identifier assigned to the corresponding user in association with each other; an output destination association table in which each piece of user information is associated with a printing apparatus that is to be an output destination; and an output-destination determining unit configured to determine the output destination of the output data by referring to the user-information registration unit and the output destination association table. The display unit is configured to notify the output-destination determining unit of the identifier contained in a request for displaying the print setting screen. The output-destination determining unit is configured to determine the output destination by referring to the user-information registration unit and the output destination association table based on a piece of user information associated with the notified identifier. The displaying unit is configured to acquire print setting data from a second print processing unit, and display the print setting screen by using the print setting data, the second print processing unit being configured to control the printing apparatus determined by the output-destination determining unit.

According to another embodiment, there is provided a non-transitory computer-readable storage medium with an executable program stored thereon and executed by a computer connected over a network to a plurality of information processing apparatuses and a plurality of printing apparatuses to create output data in response to a print request from any one of the information processing apparatuses and then to transmit the output data to an automatically-determined output destination. The program instructs the computer to perform: setting, by a first print processing unit including a displaying unit, print settings based on an input entered via a print setting screen; and determining, by the first print processing unit, the output destination of the output data in accordance with determination made by an assignment database. The assignment database includes a user-information registration unit configured to collect pieces of user information about users authorized to operate the information processing apparatuses, and register each piece of user information and an identifier assigned to the corresponding user in association with each other; an output destination association table in which each piece of user information is associated with a printing apparatus that is to be an output destination; and an output-destination determining unit configured to determine the output destination of the output data by referring to the user-information registration unit and the output destination association table. The display unit is configured to notify the output-destination determining unit of the identifier contained in a request for displaying the print setting screen. The output-destination determining unit is configured to determine the output destination by referring to the user-information registration unit and the output destination association table based on a piece of user information associated with the notified identifier. The displaying unit is configured to acquire print setting data from a second print processing unit, and display the print setting screen by using the print setting data, the second print processing unit being configured to control the printing apparatus determined by the output-destination determining unit.

According to still another embodiment, there is provided a data processing system that includes one or more information processing apparatuses; one or more printing apparatuses; and a data processing apparatus. The information processing apparatuses, the printing apparatuses, and the data processing apparatus are connected over a network. Each of the data processing apparatuses includes a virtual UI unit configured to create an image containing items for setting advanced print settings, the advanced print settings being print settings that depend on any one of the printing apparatuses that is an output destination; a print-setting storing unit configured to store the advanced print settings received by the virtual UI unit via the image; a creating unit configured to receive image data, and create a print job; a remote driver configured to convert the image data contained in the print job into data that is receivable by the printing apparatus, and output the converted data as output data; and an advanced-print-setting changing unit configured to change the output data according to the advanced print settings in a case where the advanced print settings to be applied to the output data are stored in the print-setting storing unit when the output data is output from the remote driver.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of the present invention are described below; however, the present invention is not limited to the embodiments described below. In the drawings to be referred to in the following description, identical elements are denoted by like reference numerals, and repeated descriptions are omitted as appropriate.

First Embodiment

Figure 1:
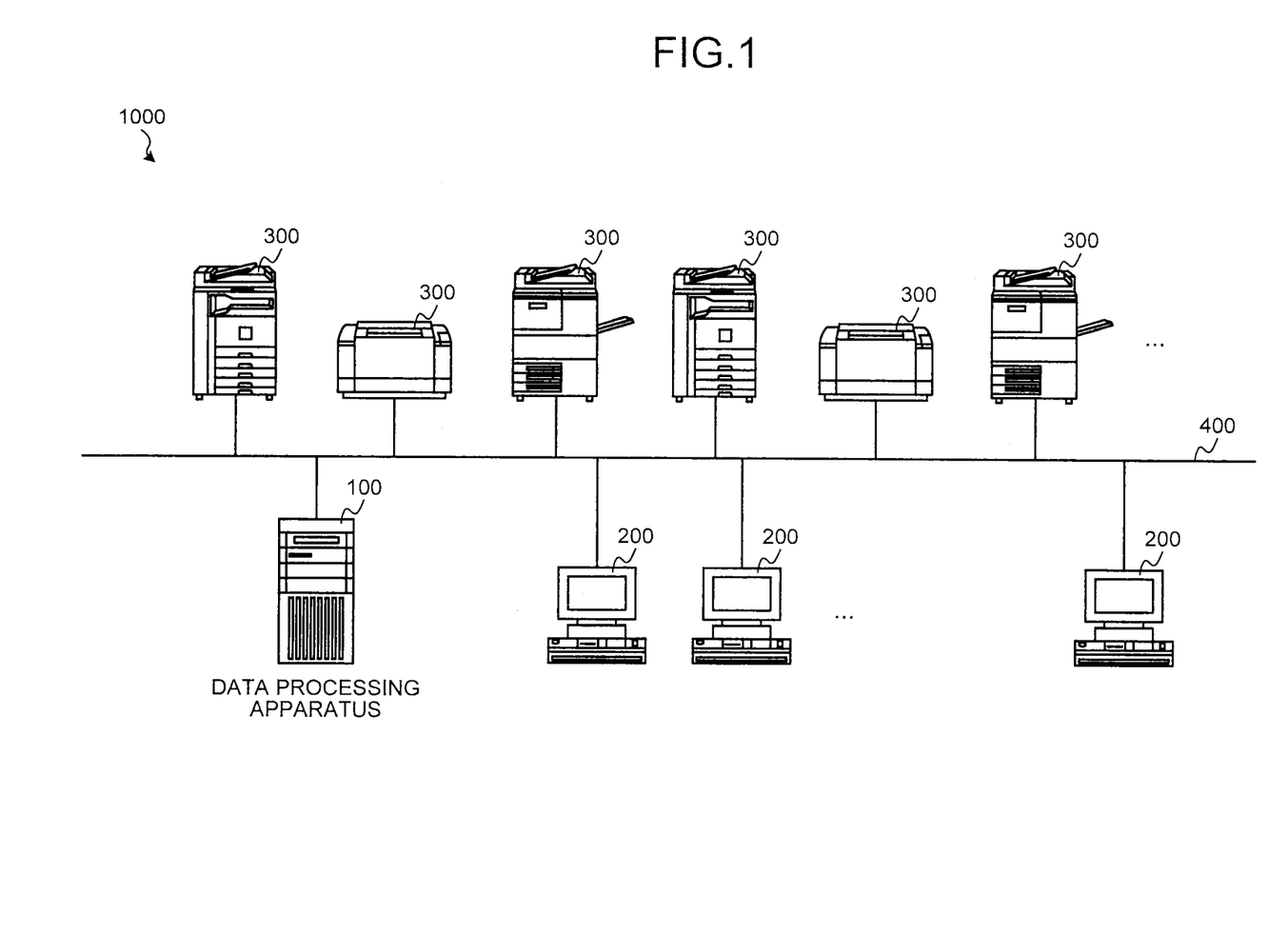
FIG. 1 is a diagram illustrating a network print system of a first embodiment.

FIG. 1 illustrates a network print system 1000 including a data processing apparatus 100 according to a first embodiment of the present invention. The network print system 1000 includes the data processing apparatus 100 implemented as a server apparatus, a plurality of clients 200 referred to as personal computers, and a plurality of remote printers 300 that are connected to one another via a network 400 referred to as a local area network (LAN), a virtual private network (VPN), the Internet, or the like.

The network print system 1000 may employ any one of a client-server environment and a thin client environment in the first embodiment. When the client-server environment is employed, each of the clients 200, on which an application program is installed, issues a print request relating to a processing result of the application to the data processing apparatus 100.

On the other hand, when the thin client environment is employed, application is not installed onto the clients 200 but installed onto the data processing apparatus 100. In this case, the client 200 issues a service request to the data processing apparatus 100 in accordance with an appropriate remote connection protocol such as a remote desktop protocol (RDP), and issues a print request relating to a result of execution of the application installed onto the data processing apparatus 100.

The data processing apparatus 100 of the first embodiment creates output data in a raw form (hereinafter, referred to as "raw data" or "output data") from print data relating to the print request received from the client 200. The data processing apparatus 100 also automatically determines the remote printer 300 that is to be an output destination by a procedure, which will be described later, and transmits the created raw data to the determined output destination.

The network print system 1000 of the first embodiment has been outlined above. A specific configuration of the data processing apparatus 100 of the first embodiment is described below with reference to FIG. 2.

Figure 2:
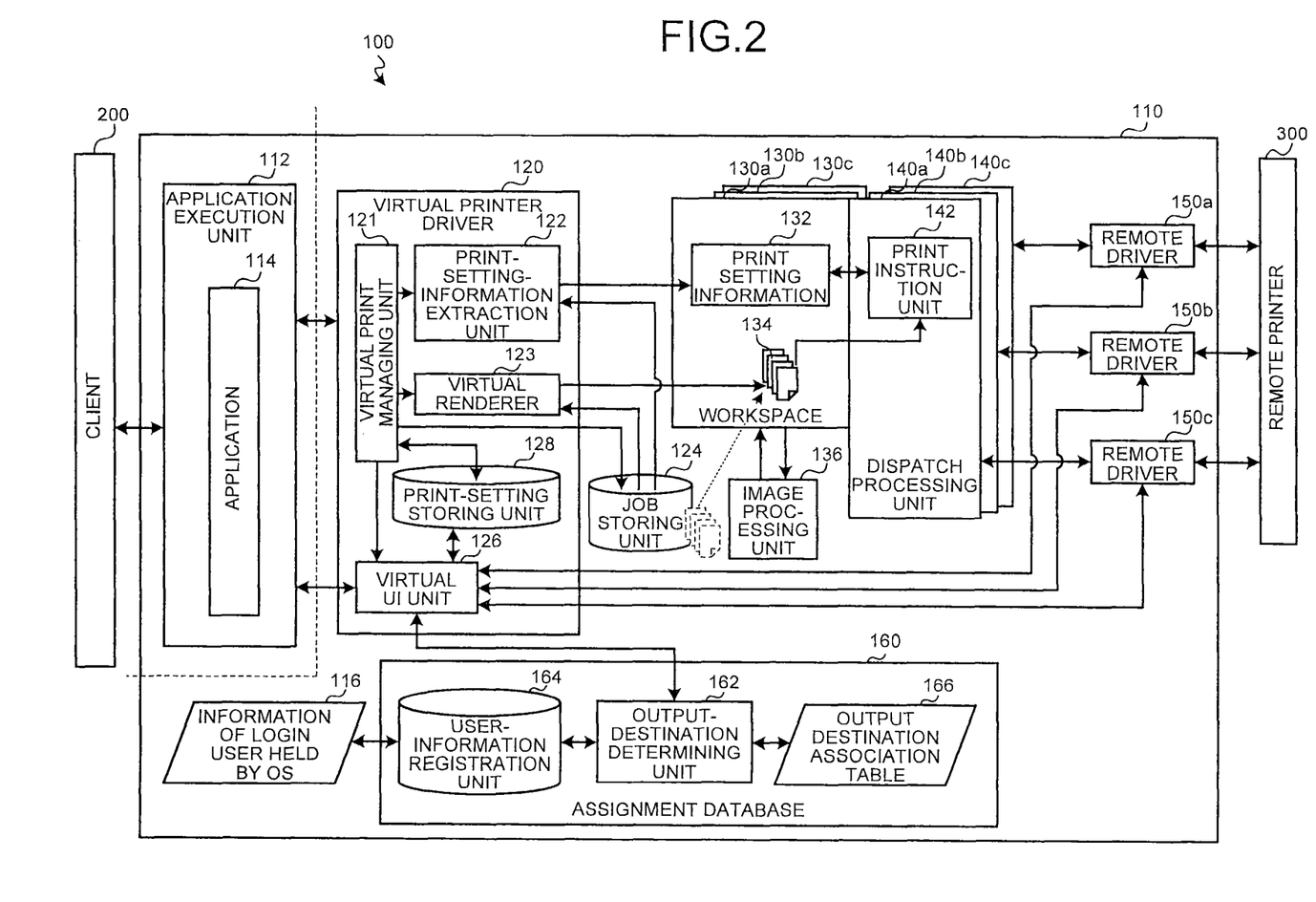
FIG. 2 is a functional block diagram of a data processing apparatus of the first embodiment.

FIG. 2 is a functional block diagram of the data processing apparatus 100 of the first embodiment. Note that FIG. 2 illustrates a functional configuration of the data processing apparatus 100 in a thin client environment. The data processing apparatus 100 in this situation includes an application execution unit 112, onto which at least one application 114 is installed, and a data processing unit 110 as illustrated in FIG. 2.

The data processing unit 110 includes a virtual printer driver 120, a job storing unit 124 for storing therein a print job as a spool file, an image processing unit 136, and an assignment database 160.

The virtual printer driver 120, which may be referred to as a first print processing unit, includes a virtual print managing unit 121, a print-setting-information extraction unit 122, a virtual renderer 123, a virtual UI unit 126, and a print-setting storing unit 128. The assignment database 160 includes an output-destination determining unit 162, a user-information registration unit 164, and an output destination association table 166.

A basic configuration of the data processing apparatus 100 of the first embodiment has been outlined above. Processes to be executed by the functional units of the data processing unit 110 when a user instructs to print a file output as a result of execution of the application 114 are described below step by step.

First, the user logs in to the data processing apparatus 100 by operating the client 200. As a result, a session is established between the client 200 and the data processing apparatus 100. At this time, an operating system (OS) installed onto the data processing apparatus 100 temporarily assigns an identifier that is unique in the data processing apparatus 100 to the user involved in the established session. Such an identifier is a known identifier referred to as a user identifier (UID), a session ID, or the like. The OS holds the identifier temporarily assigned to the login user and login user's properties (hereinafter, "user information") associated with each other while the session is maintained. Hereinafter, this identifier is referred to as "UID".

In the first embodiment, the user information held by the OS is the login user's properties acquirable by the OS at logging in of the user. Examples of the user information include a user name (account name) of the login user, a name of a group to which the login user belongs, a name of a domain or an organization in which the login user participates in Active Directory or the like, and a computer name, an IP address, a MAC address, and the like of the client 200 operated by the login user.

The user-information registration unit 164 of the assignment database 160 is continuously monitoring user information 116 of the login user held by the OS. The user-information registration unit 164 collects predetermined at least one item from the user information 116 and registers the item in a user information table.

The user information collected by the user-information registration unit 164 is used later in determination of an output destination. An administrator can set the item (user information) for use in determination of the output destination as desired. The user-information registration unit 164 collects and registers the item set by the administrator.

Figure 3:
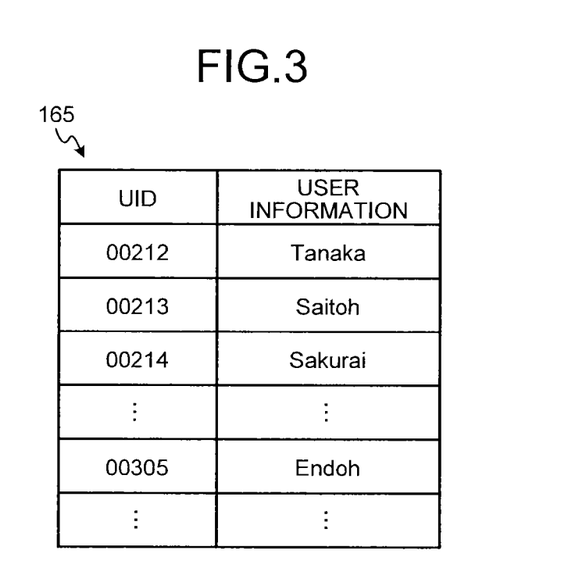
FIG. 3 is a diagram illustrating a user information table according to the first embodiment.

FIG. 3 illustrates an example of the user information table 165 in a case where "user name" is to be registered as the user information. In this example, user names (user information) of all the users currently logged in to the data processing apparatus 100 are registered in the user information table 165, in which the user names are associated with UIDs. Simultaneously when one user logs off the data processing apparatus 100, the user-information registration unit 164 deletes a user name of the user from the user information table 165.

FIG. 3 illustrates the example of the user information table 165. The user names (user information) of all the users currently logged in to the data processing apparatus 100 are stored in the user information table 165, in which the user names are respectively associated with the UIDs.

The user logged in to the data processing apparatus 100 issues a service request to the application 114 by operating the client 200. The application 114 executes a predetermined process in response to the service request from the client 200 and outputs a result of the execution as a file.

Subsequently, the user calls a print setting UI, which may be referred to as a print setting screen (hereinafter, referred to as "print dialog"), from the application 114 by operating the client 200 to give an instruction to print the file of the result of execution of the application 114. The application 114 issues a print-dialog display request to the virtual UI unit 126, which may be referred to as a display unit, in response to the call from the user. In response to the display request, the virtual UI unit 126 called by the virtual print managing unit 121 provides the print dialog by the following procedure.

The virtual UI unit 126 first makes inquiry for a dispatch destination by notifying the assignment database 160 of the UID of the request source contained in the print-dialog display request.

The assignment database 160 searches through the user information table 165 using the UID notified from the virtual UI unit 126 as a search key. If the UID notified from the virtual UI unit 126 is "00213", the output-destination determining unit 162 acquires user name "Saitoh" that is associated with the UID "00213".

Figure 4:
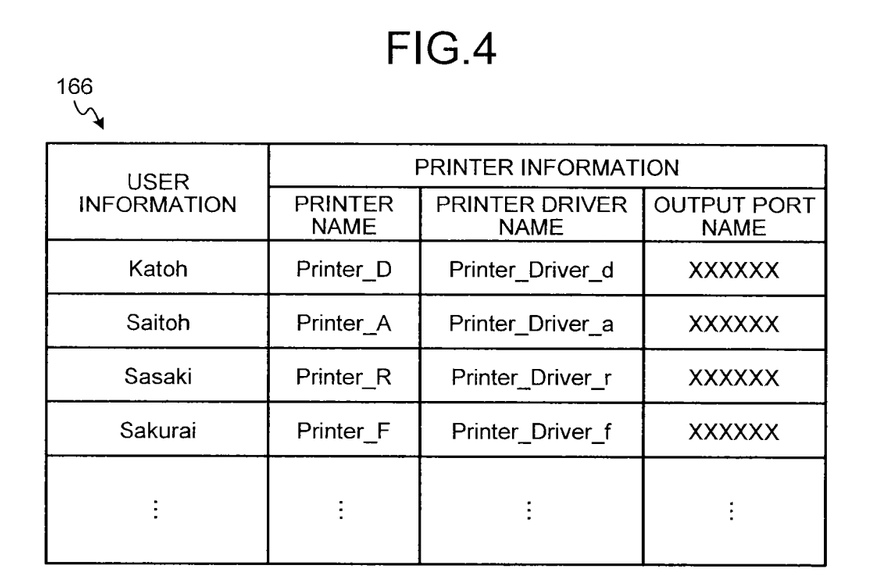
FIG. 4 is a diagram illustrating an output destination association table according to the first embodiment.

The output-destination determining unit 162 then searches through the output destination association table 166 using the user information "Saitoh" acquired from the user information table 165 as a search key.

FIG. 4 illustrates an example of the output destination association table 166. The output destination association table 166 is created in advance by an administrator in accordance with a predetermined assignment policy. Registered in the example illustrated in FIG. 4 is printer information of the remote printers 300, each of which is to be an output destination, associated with user names (user information). The printer information illustrated in FIG. 4 contains "printer name", "printer driver name", and "output port name" of each of the remote printers 300 that is to be an output destination.

As a result of the search through the output destination association table 166 using the user name "Saitoh" as the search key, the output-destination determining unit 162 determines the remote printer 300 associated with the user name "Saitoh" as an output destination, and returns printer information of the remote printer 300 and the UID "00213" to the virtual UI unit 126.

The virtual UI unit 126 holds the printer information that is returned from the assignment database 160 and associated with the UID "00213" in a temporary storage. The virtual UI unit 126 acquires a printer driver name "Printer_Driver_a" contained in the printer information, dynamically acquires a DEVMODE structure, which is a data structure for print settings, from a remote driver 150a associated with the printer driver name, and sets the DEVMODE structure to the print-setting storing unit 128.

Subsequently, the virtual UI unit 126 provides a print dialog by utilizing the DEVMODE structure acquired from the remote driver 150a. This DEVMODE structure contains function specific to the remote driver 150a (function corresponding to private member). Therefore, a print dialog configured to allow setting the function (e.g., embedded pattern printing) specific to the remote driver 150a is displayed on a screen of the application 114 utilized by the user "Saitoh".

When, in response thereto, a desired print function is selected via the print dialog where the user "Saitoh" is displayed and a print execution button is clicked, a print instruction event is generated. In response to the print instruction event, the application 714 creates image data relating to the execution result file by calling an application programming interface (API), such as a graphical device interface (DGI).

In response to the print instruction event, the virtual UI unit 126 sets print settings by utilizing the DEVMODE structure (acquired from the remote driver 150a) set to the print-setting storing unit 128 and sets settings in which the remote driver 150a is the output destination. More specifically, the virtual UI unit 126 stores the printer information of the output destination (the remote driver 150a), which has been held in the temporary storage, in the print-setting storing unit 128, in which the printer information is associated with the print settings. Hereinafter, the print settings and the printer information of the output destination stored in the print-setting storing unit 128 is collectively referred to as print setting information.

The virtual print managing unit 121 creates a print job by reading out the print setting information associated with the image data created by the application 114 from the print-setting storing unit 128 and stores the print job in the job storing unit 124.

Upon completion of storing the print job, the virtual print managing unit 121 calls the virtual renderer 123 and the print-setting-information extraction unit 122. The virtual renderer 123 reserves a workspace 130 (workspaces 130a to 130c) as a spool space that is independent on a per-print-job basis, extracts the image data 134 from the print job stored in the job storing unit 124, and moves the image data 134 to the corresponding workspace 130. The print-setting-information extraction unit 122 extracts the print setting information from the print job and moves the print setting information to the corresponding workspace 130.

In addition, the virtual print managing unit 121 creates a dispatch processing unit 140 (dispatch processing units 140a to 140c) including a print instruction unit 142 as a private instance on a per-print-job basis.

The print instruction unit 142 causes the image processing unit 136 implemented as an image processing module to acquire the image data 134 in the corresponding workspace 130 and perform image processing according to the print settings contained in the print setting information 132 in the workspace 130. The "image processing" as used herein includes not only image processing related to page allocation, imposition, and the like but also image processing related to the specific function (e.g., embedded pattern printing).

When the image processing performed on the image data 134 is completed, the print instruction unit 142 issues a print instruction to print the (image-processed) image data 134 in the workspace 130 to the remote driver 150a "Printer_Driver_a" that controls the remote printer 300 "Printer_A", which is the output destination, in accordance with the printer information of the output destination contained in the print setting information 132.

Upon receiving the print instruction from the print instruction unit 142, the remote driver 150a "Printer_Driver_a" converts the (image-processed) image data 134 in the workspace 130 to raw data (output data) and transmits the raw data (output data) to a remote printer 300 "Printer_A". Thereafter, upon receipt of a notification of completion of printing from the output destination, the instance of the dispatch processing unit 140, which is created on the per-job basis, ends.

As described above, in the network print system 1000 of the first embodiment, at a point in time when a user issues a request for displaying a print setting UI (i.e., before a print job is created), an output-destination printer is automatically determined based on user's properties acquirable by the OS at logging in of the user. Determining the output-destination printer at the point in time when the request for displaying the print setting UI is issued makes it possible to dynamically acquire a necessary DEVMODE structure from a remote driver of the output-destination printer and cause the DEVMODE structure to be reflected in the print setting UI. Therefore, the user can set, for the automatically determined output-destination printer, not only print settings relating to basic function common among all vendors but also print settings relating to function specific and inherent to the output-destination printer.

Second Embodiment

The network print system 1000 of a second embodiment is described below. The network print system 1000 of the second embodiment does not automatically determine an output-destination printer based on user's properties but determines an output-destination printer based on contents of print data relating to a print request. (The contents can be a character string contained in the print data or the like.) The network print system 1000 of the second embodiment has a similar structure to that of the first embodiment (see FIG. 1), and repeated description is omitted.

The network print system 1000 may employ any one of a client-server environment and a thin client environment in the second embodiment. Description about a case where the client-server environment is employed is the same as that of the first embodiment, and repeated description is omitted. Similarly, description about a case where the thin client environment is employed is the same as that of the first embodiment, and repeated description is omitted.

Figure 5:
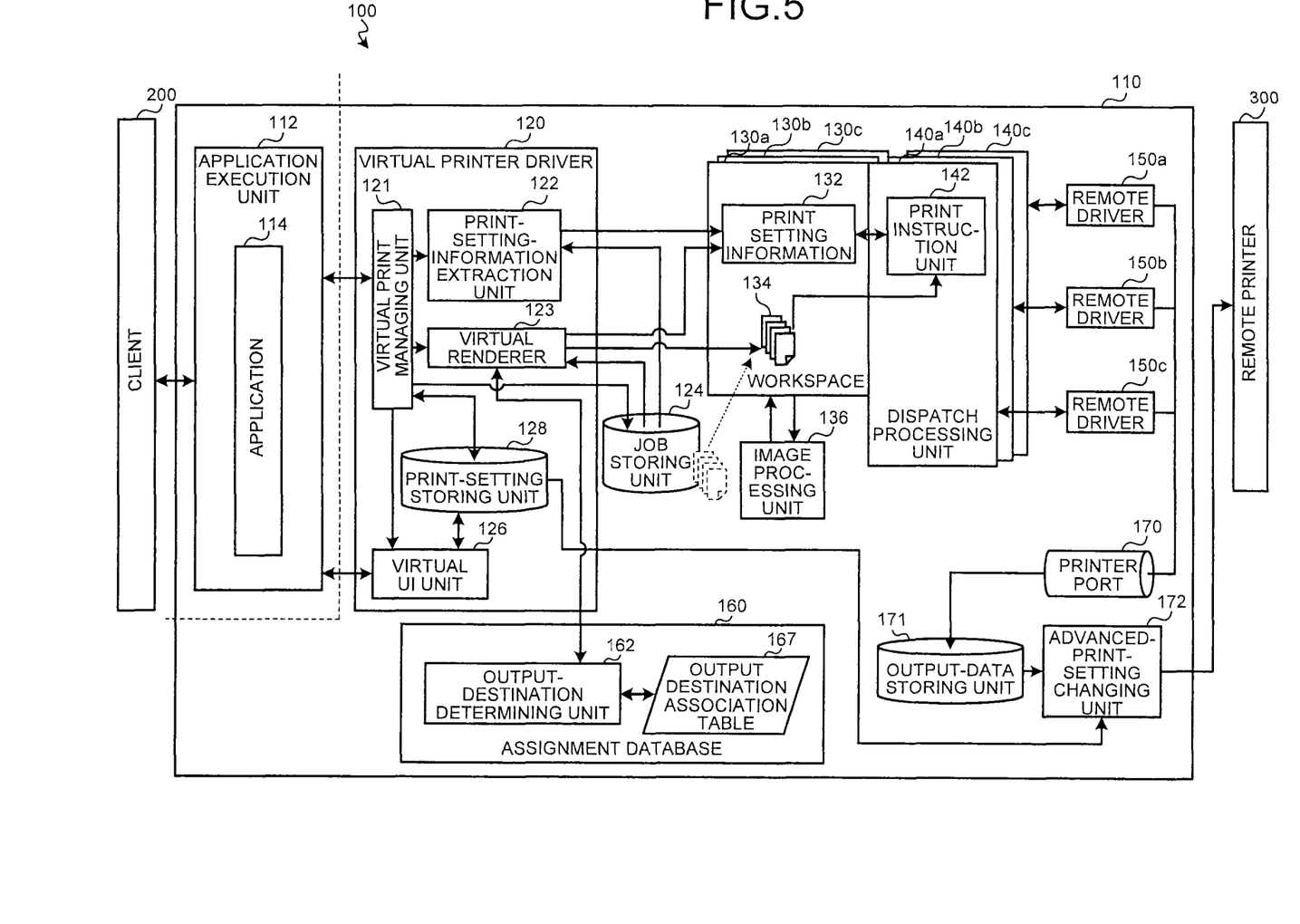
FIG. 5 is a functional block diagram of the data processing apparatus of a second embodiment.

The data processing apparatus 100 of the second embodiment creates output data (raw data) in a raw form from print data relating to a print request received from the client 200. The data processing apparatus 100 also determines the remote printer 300 that is to be an output destination according to contents of the print data by a procedure, which will be described later. The data processing apparatus 100 outputs the output data to the remote printer 300 that is to be the output destination. Moreover, function (stapling, punching, or the like) specific to the remote driver 150, which may be referred to as a second print processing unit, and set by a user is applied by an advanced-print-setting changing unit 172 of the data processing apparatus 100 by changing the output data.

The network print system 1000 of the second embodiment has been outlined above. A specific configuration of the data processing apparatus 100 of the second embodiment is described below with reference to FIG. 5.

FIG. 5 is a functional block diagram of the data processing apparatus 100 of the second embodiment. Note that FIG. 5 illustrates a functional configuration of the data processing apparatus 100 in a thin client environment. The data processing apparatus 100 in this situation includes the application execution unit 112, onto which the at least one application 114 is installed, and the data processing unit 110 as illustrated in FIG. 5.

The data processing unit 110 includes the virtual printer driver 120, the job storing unit 124 for storing therein a print job as a spool file, an output-data storing unit 171, and the advanced-print-setting changing unit 172.

The virtual printer driver 120 includes the virtual print managing unit 121, which may be referred to as a creating unit, the print-setting-information extraction unit 122, the virtual renderer 123, the virtual UI unit 126, and the print-setting storing unit 128.

A basic configuration of the data processing apparatus 100 of the second embodiment has been outlined above. Processes to be executed by the functional units of the data processing unit 110 when a user instructs to print a file output as a result of execution of the application 114 are described below step by step.

First, the user logs in to the data processing apparatus 100 by operating the client 200. As a result, a session is established between the client 200 and the data processing apparatus 100. At this time, the operating system (OS) installed onto the data processing apparatus 100 temporarily assigns an identifier that is unique in the data processing apparatus 100 to the user involved in the established session. Such an identifier is a known identifier referred to as a user identifier (UID), a session ID, or the like. The OS holds the temporarily assigned identifier and login user's properties (hereinafter, "user information") associated with the each other while the session is maintained.

In the second embodiment, the user information held by the OS is the login user's properties acquirable by the OS at logging in of the user. Examples of the user's properties include a user name (account name) of the login user, and a name of a group to which the login user belongs, a name of a domain or an organization in which the login user participates in Active Directory or the like, and a computer name, an IP address, a MAC address, and the like of the client 200 operated by the login user.

The user logged in to the data processing apparatus 100 then issues a service request to the application 114 by operating the client 200. The application 114 executes a predetermined process in response to the service request from the client 200 and outputs a result of the execution as a file.

Subsequently, the user calls a print setting UI (hereinafter, referred to as "print dialog") from the application 114 by operating the client 200 to give an instruction to print the file, which is the result of execution of the application 114. The application 114 issues a print-dialog display request to the virtual UI unit 126 in response to the call from the user. Upon receiving the display request, the virtual print managing unit 121 of the virtual printer driver 120 calls the virtual UI unit 126. The virtual UI unit 126 creates a print dialog (an image for print settings) and provides the created print dialog to the application 114.

The print dialog includes print settings relating to the basic function common among remote drivers 150a to 150c and print settings relating to functions specific to the respective remote drivers 150a to 150c. Examples of the specific function include a stapling function and a punching function.

Figure 6:
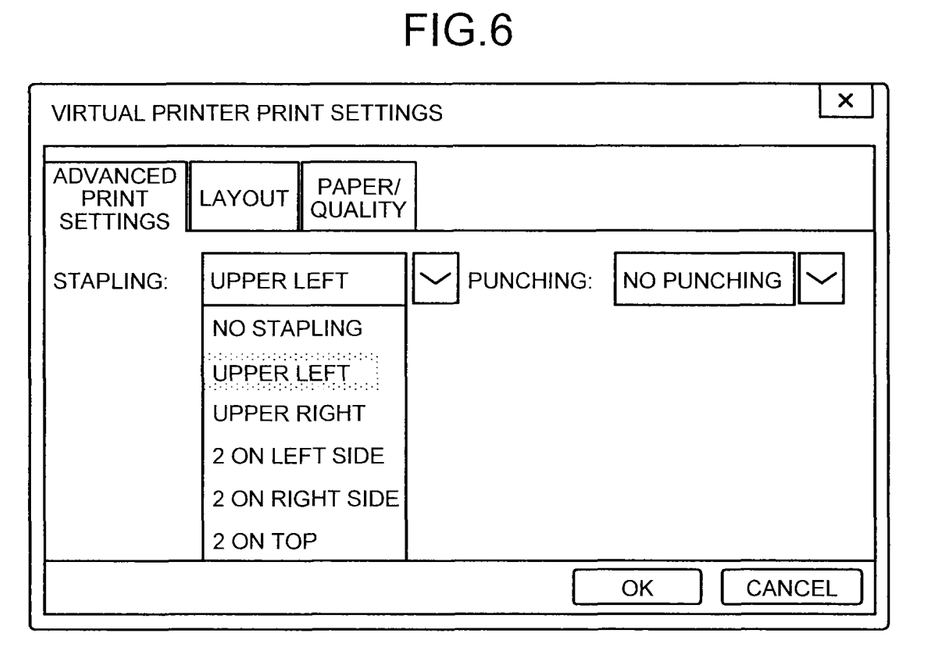
FIG. 6 is a diagram illustrating a print dialog of the second embodiment.

FIG. 6 is a diagram illustrating a print dialog of the second embodiment. In the example illustrated in FIG. 6, items (stapling and punching) displayed on an advanced print setting tab are the print settings relating to the functions specific to the respective remote drivers 150a to 150c.

In the network print system 1000 of the second embodiment, the remote driver 150 to be used, or, more specifically, which one of the remote drivers 150a to 150c is to be used, is not determined yet at a stage where a user sets print settings. Accordingly, the virtual UI unit 126 cannot identify function specific to the remote driver 150 that is usable when displaying the print dialog; instead, the virtual UI unit 126 displays print setting items of the specific functions, such as stapling and punching, on the print dialog.

The application 114 then receives desired print function settings and push-down of the print execution button via the print dialog provided by the virtual UI unit 126. When the print execution button is pushed down by a user, a print instruction event including the print settings set by the user is generated. A print designation event has an identifier (ID) for unique identification of the print designation event. In response to the print instruction event, the application 114 creates the image data 134 relating to the execution result file by calling an API, such as a graphical device interface (DGI). The image data 134 is uniquely identifiable by the identifier of the print designation event. The application 114 transmits the image data 134 to the virtual print managing unit 121.

In response to the print instruction event, the virtual UI unit 126 sets the DEVMODE structure (function corresponding to a public member) of the print-setting storing unit 128 according to the print settings (hereinafter, "basic print settings") relating to the basic function common among the remote drivers 150a to 150c. The virtual UI unit 126 also stores the print settings (hereinafter, "advanced print settings") relating to the functions specific to the respective remote drivers 150a to 150c in the print-setting storing unit 128. The virtual UI unit 126 stores the basic print settings and the advanced print settings associated with the identifier of the print designation event in the print-setting storing unit 128.

Upon receiving the image data 134 from the application 114, the virtual print managing unit 121 reads out the basic print settings of the image data 134 from the print-setting storing unit 128. More specifically, the virtual print managing unit 121 reads out the basic print settings of the image data 134 from the print-setting storing unit 128 by utilizing the identifier of the print designation event associated with the image data 134.

The virtual print managing unit 121 then creates a print job containing the image data 134 and the basic print settings. The print job has an identifier (ID) for unique identification of the print job. The second embodiment is described on an assumption that the identifier of the print job is the same as the identifier of the print designation event. The virtual print managing unit 121 stores the print job in the job storing unit 124.

The virtual print managing unit 121 then calls the virtual renderer 123 and the print-setting-information extraction unit 122. The virtual renderer 123 extracts the image data 134 from the print job. The virtual renderer 123 transmits the extracted image data 134 to the output-destination determining unit 162 of the assignment database 160. Upon receiving the image data 134, the output-destination determining unit 162 determines an output destination printer (the remote driver 150) based on a character string contained in the image data 134 and an output destination association table 167.

Figure 7:
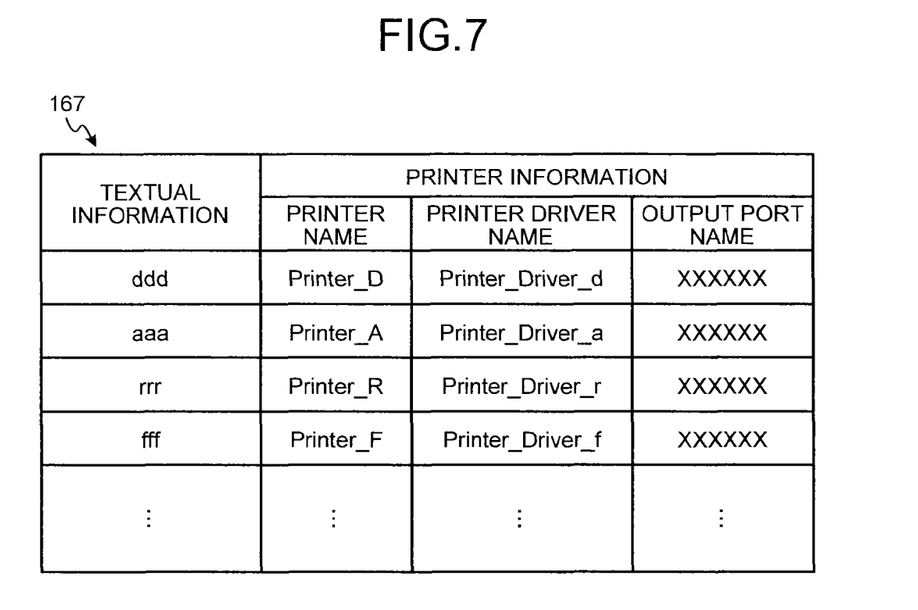
FIG. 7 is a diagram illustrating an output destination association table according to the second embodiment.

FIG. 7 is a diagram illustrating the output destination association table 167 of the second embodiment. The output destination association table 167 is created in advance by an administrator in accordance with a predetermined assignment policy. Registered in the example of the output destination association table 167 illustrated in FIG. 7 is printer information of the remote printers 300, each of which is to be an output destination, associated with character strings (textual information). The printer information illustrated in FIG. 7 contains "printer name", "printer driver name", and "output port name" of each of the remote printers 300.

Description is made by way of an example case where the output-destination determining unit 162 finds that the image data 134 contains "aaa" as a result of search through the image data 134. In this case, the output-destination determining unit 162 determines the remote printer 300, of which printer information is identified by the printer name "Printer_a", the printer driver name "Printer_Driver_a", and an output port name "XXXXXX", as the output-destination remote printer 300.

The output-destination determining unit 162 transmits the printer information of the remote printer 300 determined as the output destination to the virtual renderer 123.

The virtual renderer 123 receives the printer information from the output-destination determining unit 162. The virtual renderer 123 then reserves the workspace 130 as a spool space that is independent on a per-print-job basis. The print-setting-information extraction unit 122 extracts the print setting information 132 from the print job and moves the print setting information 132 to the corresponding workspace 130. The virtual renderer 123 moves the image data 134 extracted from the print job in the job storing unit 124 to the workspace 130 corresponding to the print job. The virtual renderer 123 also adds the printer information received from the output-destination determining unit 162 to the print setting information 132 in the workspace 130.

Moreover, the virtual print managing unit 121 creates the dispatch processing unit 140 including the print instruction unit 142 as a private instance on a per-print-job basis.

The print instruction unit 142 causes the image processing unit 136 implemented as an image processing module to acquire the image data 134 in the workspace 130. The image processing unit 136 performs image processing according to the print settings contained in the print setting information 132 in the workspace 130. The "image processing" as used herein includes image processing related to page allocation, imposition, and the like.

When the image processing on the image data 134 performed by the image processing unit 136 is completed, the print instruction unit 142 refers to the printer information of the output destination contained in the print setting information 132. Description below is made specifically by way of an example case where the printer name in the printer information is "Printer_A". In this case, the print instruction unit 142 issues a print instruction to print the (image-processed) image data 134 in the workspace 130 to the remote driver 150a "Printer_Driver_a" that controls the remote printer 300 "Printer_A", which is the output destination.

Upon receiving the print instruction from the print instruction unit 142, the remote driver 150a "Printer_Driver_a" converts the (image-processed) image data 134 in the workspace 130 to data receivable by the remote printer 300a. The remote driver 150a "Printer_Driver_a" transmits the converted data as output data (raw data) to a printer port 170.

The printer port 170 receives the output data output from the remote driver 150. The printer port 170 stores the output data in the output-data storing unit 171.

Upon detecting that the output data is stored in the output-data storing unit 171, the advanced-print-setting changing unit 172 reads out the output data from the output-data storing unit 171. The advanced-print-setting changing unit 172 changes settings of the output data according to the advanced print settings in the print-setting storing unit 128. The advanced-print-setting changing unit 172 outputs the changed output data to the remote printer 300. Operation of the advanced-print-setting changing unit 172 will be described in detail later.

Upon receipt of a notification of completion of printing from the output-destination remote printer 300, the instance of the dispatch processing unit 140, which is created on the per-job basis, ends.

Figure 8:
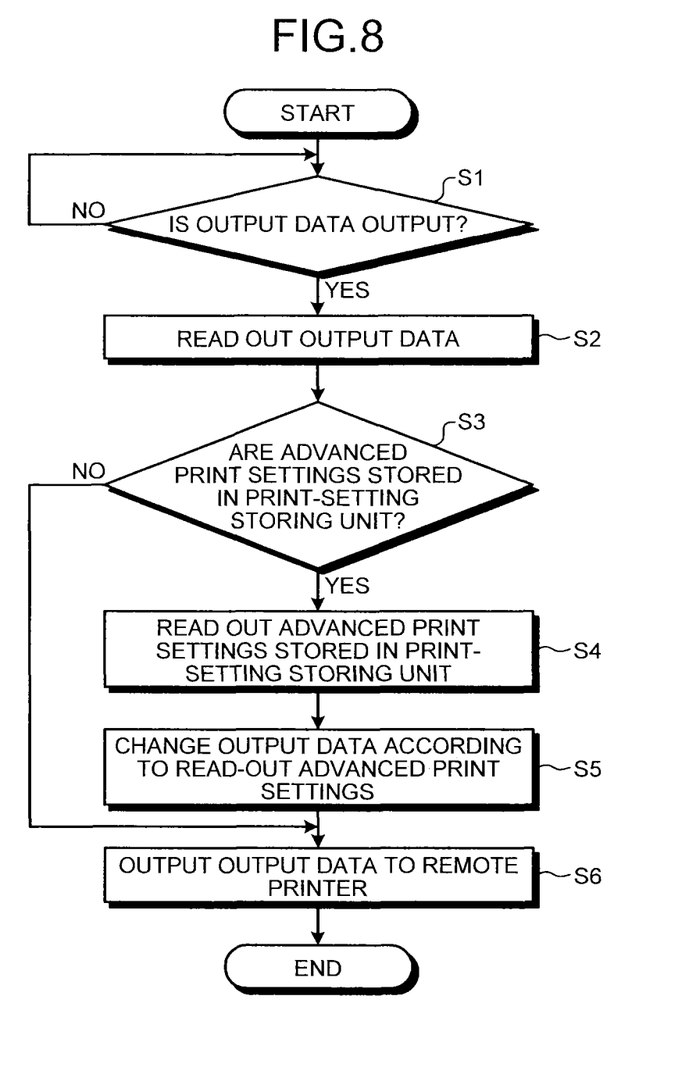
FIG. 8 is a flowchart for illustrating an operation of an advanced-print-setting changing unit of the second embodiment.

FIG. 8 is a flowchart for illustrating the operation of the advanced-print-setting changing unit 172 of the second embodiment. The advanced-print-setting changing unit 172 determines whether or not output data is output from the printer port 170 to the output-data storing unit 171 (Step S1). When output data is output (Yes in Step S1), the advanced-print-setting changing unit 172 reads out the output data from the output-data storing unit 171 (Step S2). When output data is not output (No in Step S1), the advanced-print-setting changing unit 172 waits for output of output data from the printer port 170 to the output-data storing unit 171.

The advanced-print-setting changing unit 172 then determines whether or not advanced print settings are stored in the print-setting storing unit 128 (Step S3). More specifically, the advanced-print-setting changing unit 172 determines whether or not advanced print settings to be applied to the output data are stored in the print-setting storing unit 128 by using an identifier (which is the same as the identifier of the print designation event in the second embodiment) of the print job contained in the output data as a search key.

When the advanced print settings are stored (Yes in Step S3), the advanced-print-setting changing unit 172 reads out the advanced print settings from the print-setting storing unit 128 (Step S4). The advanced-print-setting changing unit 172 then changes the output data according to the read-out advanced print settings (Step S5). More specifically, the advanced-print-setting changing unit 172 changes the output data by directly editing description; related to the advanced print settings contained in the output data (raw data). The advanced-print-setting changing unit 172 then outputs the output data changed in Step S5 to the remote printer 300 (Step S6).

When the advanced print settings are not stored (No in Step S3), the advanced-print-setting changing unit 172 outputs the output data, which is unchanged, to the remote printer 300 (Step S6).

As described above, in the network print system 1000 of the second embodiment, the virtual UI unit 126 creates an image (print dialog) that contains items for setting the advanced print settings, which are print settings that depend on a model of the output-destination remote printer 300. Moreover, the print-setting storing unit 128 stores the advanced print settings received by the virtual UI unit 126 via the print dialog. When output data is output from the remote driver 150 of the output-destination remote printer 300 in a situation where advanced print settings to be applied to the output data are stored in the print-setting storing unit 128, the advanced-print-setting changing unit 172 changes the output data according to the advanced print settings.

Accordingly, the network print system 1000 of the second embodiment allows, in assignment of a print destination in a multi-vendor environment, setting not only print settings relating to the basic function common among all vendors but also print settings relating to the function specific and inherent to each vender. Moreover, the network print system 1000 of the second embodiment allows, even when a destination printer is not automatically determined at logging in of a user, setting print settings relating to the function specific and inherent to each vender.

Figure 9:
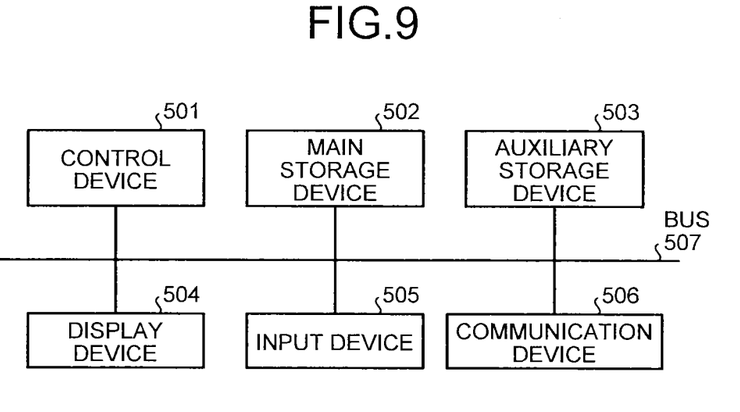
FIG. 9 is a diagram illustrating a hardware configuration of the data processing apparatus of the first and second embodiments.

Finally, a hardware configuration of the data processing apparatus 100 of the first and second embodiments is described below. FIG. 9 is a diagram illustrating the hardware configuration of the data processing apparatus 100 of the first and second embodiments. The data processing apparatus 100 of the first and second embodiments includes a control device 501, a main storage device 502, an auxiliary storage device 503, a display device 504, an input device 505, and a communication device 506. The control device 501, the main storage device 502, the auxiliary storage device 503, the display device 504, the input device 505, and the communication device 506 are connected to one another via a bus 507.

The control device 501 executes program instructions read out from the auxiliary storage device 503 onto the main storage device 502. The main storage device 502 is a memory, such as a read only memory (ROM) or a random access memory (RAM). The auxiliary storage device 503 is a hard disk drive, for example. The display device 504 is a screen, on which a state of the data processing apparatus 100 and the like are displayed. The input device 505 is an interface for inputting information to the data processing apparatus 100. The communication device 506 is an interface for connection to a network.

Program instructions to be executed by the data processing apparatus 100 of the first and second embodiments have a module configuration that includes functional blocks of the data processing apparatus 100 described above. From the viewpoint of actual hardware, the control device 501 reads out the program instructions from the storage medium and executes the program instructions, thereby loading modules into the main storage device 502. Accordingly, the modules are generated on the main storage device 502. Alternatively, some or all of the functional blocks of the data processing apparatus 100 may be implemented in hardware such as an integrated circuit (IC) rather than in the program instructions.

The above functions of the first and second embodiments can be implemented by apparatus-executable program instructions written in an object-oriented programming language such as C, C++, C#, or Java (registered trademark). The program instructions of the first and second embodiments can be distributed as being stored in a machine-readable storage medium such as a compact-disk read-only memory (CD-ROM), a magneto-optical disk (MO), a digital versatile disc (DVD), a flexible disk, an electrically erasable programmable read-only memory (EEPROM), or an erasable programmable read-only memory (EPROM), and transmitted over a network in a form usable by other apparatus.

Embodiments of the present invention have been described above; however, the present invention is not limited to the embodiments described above. For instance, the application execution unit 112 illustrated in FIG. 2 may be installed on a terminal server other than the clients 200 and the data processing apparatus 100. In this case, a network boundary is defined by the dotted line indicated in FIG. 2, and the data processing apparatus 100 is implemented as a printer server. Further alternatively, the functional units described above included in the data processing unit 110 illustrated in FIG. 2 may be distributed across the network in appropriate units. In this case, the present invention may preferably be embodied as a network-based data processing system. The appended claims are to be construed as encompassing all modifications and alternative constructions that may occur to one skilled in the art without departing from the scope of the present invention.

As described above, according to an aspect of an embodiment, there are provided a data processing apparatus, a data processing system, and a computer-readable storage medium that allow, in assignment of a print destination in a multi-vendor environment, setting not only print settings relating to basic function common among all vendors but also print settings relating to function specific and inherent to each vender.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A data processing apparatus connected over a network to a plurality of information processing apparatuses and a plurality of printing apparatuses to create output data in response to a print request from any one of the information processing apparatuses and then to transmit the output data to an automatically-determined output destination, the data processing apparatus comprising:
a first print processing unit configured to receive print data relating to the print request, and control processing on the print data;
a plurality of second print processing units for the plurality of printing apparatuses, respectively, each second print processing unit being configured to convert the print data that has been processed by the first print processing unit into output data that is processable by the corresponding printing apparatus;
a determining unit configured to determine a second print processing unit that is to process the print data that has been processed by the first print processing unit, from among the plurality of second print processing units;
a display unit configured to display a print setting screen including an item for a basic print setting and an item for an advanced print setting before the first print processing unit receives the print data, the basic print setting being common among the plurality of second print processing unit and the advanced print setting being specific to a respective second print processing unit;
a print setting storage unit configured to store identification information for identifying the print request and the advanced print setting among from print settings received through the print setting screen displayed on the display unit in response to the print request so that the identification information and the advanced print setting are associated with each other; and
an advanced print setting changing unit configured to acquire the advanced print setting that corresponds to the print data converted by a corresponding second print processing unit and is stored by the print setting storage unit, and change the print data in accordance with the advanced print setting,
wherein the first print processing unit is configured to control processing on the print data based on the basic print setting received through the print setting screen displayed on the display unit.

2. A non-transitory computer-readable storage medium with an executable program stored thereon and executed by a data processing apparatus connected over a network to a plurality of information processing apparatuses and a plurality of printing apparatuses to create output data in response to a print request from any one of the information processing apparatuses and then to transmit the output data to an automatically-determined output destination, wherein the program instructs the computer to perform:
receiving, by a first print processing unit, print data relating to the print request, and controlling processing on the print data;
converting, by a second print processing unit of a plurality of second print processing units for the plurality of printing apparatuses, respectively, the print data that has been processed by the first print processing unit into output data that is processable by the corresponding printing apparatus;
determining, by a determining unit, a second print processing unit that is to process the print data that has been processed by the first print processing unit, from among the plurality of second print processing units;
displaying, by a display unit, a print setting screen including an item for a basic print setting and an item for an advanced print setting before the first print processing unit receives the print data the basic print setting being common among the plurality of second print processing units and the advanced print setting being specific to a respective second print processing unit;
storing, by a print setting storage unit, identification information for identifying the print request and the advanced print setting among from print settings received through the print setting screen displayed on the display unit in response to the print request so that the identification information and the advanced print setting are associated with each other;
acquiring, by an advanced print setting changing unit, the advanced print setting that corresponds to the print data converted by a corresponding second print processing unit and is stored by the print setting storage unit, and changing the print data in accordance with the advanced print setting
controlling processing, of the first print processing unit, on the print data based on the basic print setting received through the print setting screen displayed on the display unit.

3. A data processing system comprising:
one or more information processing apparatuses;

one or more printing apparatuses; and a data processing apparatus, wherein the information processing apparatuses, the printing apparatuses, and the data processing apparatus are connected over a network, and the data processing apparatus includes a virtual driver configured to receive print data relating to a print request from any one of the information processing apparatuses, and control processing on the print data, a plurality of remote drivers for the one or more printing apparatuses, respectively, each remote driver being configured to convert the print data that has been processed by the virtual driver into output data that is processable by the corresponding remote driver, a virtual UI configured to determine a remote driver that is to process the print data that has been processed by the virtual driver, from among the plurality of remote drivers, a display unit configured to display a print setting screen including an item for a basic print setting and an item for an advanced print setting before the virtual driver receives the print data, the basic print setting being common among the plurality of remote drivers and the advanced print setting being specific to a respective remote driver;

a print setting storage unit configured to store identification information for identifying the print request and the advanced print setting among from print settings received through the print setting screen displayed on the display unit in response to the print request so that the identification information and the advanced print setting are associated with each other, and an advanced print setting changing unit configured to acquire the advanced print setting that corresponds to the print data converted by a corresponding remote driver and is stored by the print setting storage unit, and change the print data in accordance with the advanced print setting, wherein the virtual driver is configured to control processing on the print data based on the basic print setting received through the print setting screen displayed on the display unit.

4. The data processing apparatus according to claim 1, wherein the second print processing unit is configured to output the output data containing the identification information, and the advanced print setting changing unit is configured to determine whether the advanced print setting to be applied to the print data is stored in the print setting storing unit by searching through advanced print settings stored in the print setting storing unit using the identification information contained in the output data as a search key.

5. The data processing apparatus according to claim 1, wherein the advanced print setting includes settings as to whether stapling is to be performed.

6. The data processing apparatus according to claim 3, wherein the advanced print setting includes settings as to whether punching is to be performed.

* * * * *